(12) United States Patent
Shelar et al.

(10) Patent No.: US 11,178,051 B2
(45) Date of Patent: Nov. 16, 2021

(54) PACKET KEY PARSER FOR FLOW-BASED FORWARDING ELEMENTS

(71) Applicant: VMware, Inc., Palo Alto, CA (US)

(72) Inventors: Pravin Shelar, Sunnyvale, CA (US); Jarno Rajahalme, Belmont, CA (US)

(73) Assignee: VMWARE, INC., Palo Alto, CA (US)

( * ) Notice: Subject to any disclaimer, the term of this patent is extended or adjusted under 35 U.S.C. 154(b) by 52 days.

(21) Appl. No.: 14/539,551

(22) Filed: Nov. 12, 2014

(65) Prior Publication Data
US 2016/0094460 A1 Mar. 31, 2016

Related U.S. Application Data

(60) Provisional application No. 62/058,071, filed on Sep. 30, 2014.

(51) Int. Cl.
*H04L 12/00* (2006.01)
*H04L 12/771* (2013.01)

(52) U.S. Cl.
CPC .................... *H04L 45/56* (2013.01)

(58) Field of Classification Search
CPC ....... H04L 69/22; H04L 45/745; H04L 45/38; H04L 47/2441; H04L 45/56; H04L 45/64; H04L 45/54; H04L 45/7453; H04W 40/24
USPC .......................................... 370/392; 711/135
See application file for complete search history.

(56) References Cited

U.S. PATENT DOCUMENTS

| | | |
|---|---|---|
| 5,504,921 A | 4/1996 | Dev et al. |
| 5,550,816 A | 8/1996 | Hardwick et al. |
| 5,729,685 A | 3/1998 | Chatwani et al. |
| 5,751,967 A | 5/1998 | Raab et al. |
| 6,104,699 A | 8/2000 | Holender et al. |
| 6,118,760 A | 9/2000 | Zaumen et al. |
| 6,141,738 A | 10/2000 | Munter et al. |
| 6,219,699 B1 | 4/2001 | McCloghrie et al. |
| 6,442,549 B1 | 8/2002 | Schneider |
| 6,456,624 B1 | 9/2002 | Eccles et al. |
| 6,512,745 B1 | 1/2003 | Abe et al. |

(Continued)

FOREIGN PATENT DOCUMENTS

| | | |
|---|---|---|
| EP | 1154601 A1 | 11/2001 |
| JP | 2003069609 A | 3/2003 |

(Continued)

OTHER PUBLICATIONS

Open Network Foundation OpenFlow switch Specification Version 1.4.0 dated Oct. 14, 2014.*

(Continued)

*Primary Examiner* — Noel R Beharry
*Assistant Examiner* — Lionel Preval
(74) *Attorney, Agent, or Firm* — Adeli LLP

(57) ABSTRACT

Some embodiments provide a forwarding element that parses a packet to selectively extract a set of header field values for a flow key. The forwarding element then uses the flow key to find a matching flow to process the packet. In some embodiments, the forwarding element chooses the set of header values following the match pattern of a set of one or more flows. The forwarding element of some embodiments chooses the set of header values based on a wildcard mask that is associated with a flow entry or a flow table mask that is associated with a flow table.

20 Claims, 10 Drawing Sheets

(56) References Cited

U.S. PATENT DOCUMENTS

| | | |
|---|---|---|
| 6,539,432 B1 | 3/2003 | Taguchi et al. |
| 6,574,709 B1 | 6/2003 | Skazinski et al. |
| 6,633,565 B1 | 10/2003 | Bronstein et al. |
| 6,658,002 B1 | 12/2003 | Ross et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,963,585 B1 | 11/2005 | Pennec et al. |
| 6,999,454 B1 | 2/2006 | Crump |
| 7,062,559 B2 | 6/2006 | Koshimura et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,555,002 B2 | 6/2009 | Arndt et al. |
| 7,606,260 B2 | 10/2009 | Oguchi et al. |
| 7,633,955 B1 | 12/2009 | Saraiya et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,161,270 B1 | 4/2012 | Parker et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,456,984 B2 | 6/2013 | Ranganathan et al. |
| 8,504,718 B2 | 8/2013 | Wang et al. |
| 8,571,031 B2 | 10/2013 | Davies et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,762,501 B2 | 6/2014 | Kempf et al. |
| 8,838,743 B2 | 9/2014 | Lewites et al. |
| 9,036,636 B1 | 5/2015 | Sherwood et al. |
| 9,042,234 B1 | 5/2015 | Liljenstolpe et al. |
| 9,203,771 B1 | 12/2015 | Cai et al. |
| 9,244,843 B1 | 1/2016 | Michels et al. |
| 9,325,630 B2 * | 4/2016 | Graf ................ H04L 47/31 |
| 9,569,368 B2 | 2/2017 | Jackson |
| 9,602,398 B2 | 3/2017 | Pettit et al. |
| 9,674,087 B2 | 6/2017 | Jackson et al. |
| 9,680,738 B2 | 6/2017 | Jackson et al. |
| 9,680,748 B2 | 6/2017 | Jackson et al. |
| 9,686,185 B2 | 6/2017 | Shelly et al. |
| 9,686,200 B2 | 6/2017 | Pettit et al. |
| 9,985,896 B2 | 5/2018 | Koponen et al. |
| 9,996,467 B2 | 6/2018 | Jackson |
| 10,380,019 B2 | 8/2019 | Jackson |
| 10,382,324 B2 | 8/2019 | Pettit et al. |
| 10,498,638 B2 | 12/2019 | Jackson et al. |
| 10,659,373 B2 | 5/2020 | Koponen et al. |
| 2001/0043614 A1 | 11/2001 | Viswanadham et al. |
| 2002/0089931 A1 | 7/2002 | Takada et al. |
| 2002/0091802 A1 | 7/2002 | Paul et al. |
| 2002/0093952 A1 | 7/2002 | Gonda |
| 2002/0194369 A1 | 12/2002 | Rawlins et al. |
| 2003/0014568 A1 | 1/2003 | Kishi et al. |
| 2003/0041170 A1 | 2/2003 | Suzuki |
| 2003/0058850 A1 | 3/2003 | Rangarajan et al. |
| 2003/0214948 A1 | 11/2003 | Jin et al. |
| 2004/0016000 A1 | 1/2004 | Zhang et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0225638 A1 | 11/2004 | Geiselhart et al. |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0111445 A1 | 5/2005 | Wybenga et al. |
| 2005/0120160 A1 | 6/2005 | Plouffe et al. |
| 2005/0182853 A1 | 8/2005 | Lewites et al. |
| 2005/0192922 A1 | 9/2005 | Edlund et al. |
| 2005/0220096 A1 | 10/2005 | Friskney et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0221961 A1 | 10/2006 | Basso et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0156919 A1 | 7/2007 | Potti et al. |
| 2007/0192543 A1 | 8/2007 | Naik et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | Heer |
| 2008/0240095 A1 | 10/2008 | Basturk |
| 2009/0039884 A1 | 2/2009 | Schiano et al. |
| 2009/0086651 A1 * | 4/2009 | Luft ................ H04L 41/5067 370/253 |
| 2009/0138577 A1 | 5/2009 | Casado et al. |
| 2009/0150527 A1 | 6/2009 | Tripathi et al. |
| 2009/0161547 A1 | 6/2009 | Riddle et al. |
| 2009/0292858 A1 | 11/2009 | Lambeth et al. |
| 2009/0300340 A1 | 12/2009 | Chou et al. |
| 2010/0131636 A1 | 5/2010 | Suri et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |

(56) References Cited

U.S. PATENT DOCUMENTS

| | | |
|---|---|---|
| 2011/0022695 A1 | 1/2011 | Dalal et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0153908 A1 | 6/2011 | Schaefer et al. |
| 2011/0164503 A1 | 7/2011 | Vong et al. |
| 2011/0194567 A1 | 8/2011 | Shen |
| 2011/0202920 A1 | 8/2011 | Takase |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2012/0054445 A1 | 3/2012 | Swart et al. |
| 2012/0079478 A1 | 3/2012 | Galles et al. |
| 2012/0096225 A1 | 4/2012 | Khawand et al. |
| 2012/0182992 A1 | 7/2012 | Cowart et al. |
| 2013/0024579 A1 | 1/2013 | Zhang et al. |
| 2013/0054761 A1 | 2/2013 | Kempf et al. |
| 2013/0058346 A1 | 3/2013 | Sridharan et al. |
| 2013/0163426 A1* | 6/2013 | Beliveau ............... H04L 67/327 370/235 |
| 2013/0163427 A1 | 6/2013 | Beliveau et al. |
| 2013/0163475 A1 | 6/2013 | Beliveau et al. |
| 2013/0339544 A1 | 12/2013 | Mithyantha |
| 2014/0016647 A1* | 1/2014 | Yoshida ............... H04L 12/4666 370/395.53 |
| 2014/0019639 A1 | 1/2014 | Ueno |
| 2014/0098669 A1 | 4/2014 | Garg et al. |
| 2014/0115578 A1 | 4/2014 | Cooper et al. |
| 2014/0226661 A1* | 8/2014 | Mekkattuparamban ...................... H04L 49/70 370/392 |
| 2014/0233421 A1 | 8/2014 | Matthews |
| 2014/0280822 A1 | 9/2014 | Chennimalai Sankaran et al. |
| 2014/0328344 A1* | 11/2014 | Bosshart ............... H04L 45/74 370/392 |
| 2014/0369348 A1 | 12/2014 | Zhang et al. |
| 2015/0009831 A1 | 1/2015 | Graf |
| 2015/0078384 A1 | 3/2015 | Jackson et al. |
| 2015/0078385 A1 | 3/2015 | Shelly et al. |
| 2015/0078386 A1 | 3/2015 | Jackson et al. |
| 2015/0081833 A1 | 3/2015 | Pettit et al. |
| 2015/0092778 A1 | 4/2015 | Jackson et al. |
| 2015/0131666 A1* | 5/2015 | Kang ............... H04L 45/745 370/392 |
| 2015/0169451 A1 | 6/2015 | Jackson |
| 2015/0169457 A1* | 6/2015 | Jackson ............... G06F 12/121 711/135 |
| 2015/0172174 A1* | 6/2015 | Kojima ............... H04L 47/2483 370/392 |
| 2015/0172189 A1* | 6/2015 | Pitchai ............... H04L 45/7453 370/392 |
| 2015/0242429 A1* | 8/2015 | Varvello ............... H04L 45/7453 707/752 |
| 2015/0281082 A1* | 10/2015 | Rajahalme .......... H04L 45/7453 370/392 |
| 2015/0281098 A1 | 10/2015 | Pettit et al. |
| 2015/0281125 A1 | 10/2015 | Koponen et al. |
| 2015/0319088 A1* | 11/2015 | Wenig ............... H04L 45/745 370/392 |
| 2016/0197831 A1* | 7/2016 | De Foy ............... H04L 45/566 370/392 |
| 2017/0126588 A1* | 5/2017 | Anand ............... H04L 49/70 |
| 2017/0171065 A1 | 6/2017 | Pettit et al. |
| 2017/0237664 A1 | 8/2017 | Jackson et al. |
| 2018/0262434 A1 | 9/2018 | Koponen et al. |
| 2018/0300244 A1 | 10/2018 | Jackson |

FOREIGN PATENT DOCUMENTS

| | | |
|---|---|---|
| JP | 2003124976 A | 4/2003 |
| JP | 2003318949 A | 11/2003 |
| WO | 2012126488 A1 | 9/2012 |
| WO | 2014126387 A1 | 8/2014 |
| WO | 2015038198 A1 | 3/2015 |

OTHER PUBLICATIONS

Author Unknown, "Open vSwitch, An Open Virtual Switch," Dec. 30, 2010, 2 pages, Cisco Systems, Inc.

Author Unknown, "OpenFlow Switch Specification, Version 0.9.0 (Wire Protocol 0x98)," Jul. 20, 2009, 36 pages, Open Networking Foundation.

Author Unknown, OpenFlow Switch Specification, Version 1.0.0 (Wire Protocol 0x01), Dec. 31, 2009, 42 pages, Open Networking Foundation.

Author Unknown, "OpenFlow Switch Specification, Version 1.1.0 Implemented (Wire Protocol 0x02)," Feb. 28, 2011, 56 pages, Open Networking Foundation.

Curtis, Andrew R., et al., "DevoFlow: Scaling Flow Management for High-Performance Networks," SIGCOMM '11, Aug. 15-19, 2011, 12 pages, ACM.

Das, Saurav, et al., "Simple Unified Control for Packet and Circuit Networks," Month Unknown 2009, 2 pages, IEEE.

Das, Saurav, et al., "Unifying Packet and Circuit Switched Networks with OpenFlow," Dec. 7, 2009, 10 pages, available at http://OpenFlowSwitch.org/downloads/technicalreports/openflow-tr-2009-4-unification.pdf.

Fernandes, Natalia C., et al., "Virtual Networks: Isolation, Performance, and Trends," Annals of Telecommunications, Oct. 7, 2010, 17 pages, vol. 66, Institut Télécom and Springer-Verlag, Paris.

Foster, Nate, et al. "Frenetic: A Network Programming Language," ICFP '11, Sep. 19-21, 2011, 13 pages, Tokyo, Japan.

Koponen, Teemu, et al., "Network Virtualization in Multi-tenant Datacenters," Technical Report TR-2013-001E, Aug. 2013, 22 pages, VMware, Inc., Palo Alto, CA, USA.

Matsumoto, Nobutaka, et al., "LightFlow: Speeding Up GPU-based Flow Switching and Facilitating Maintenance of Flow Table," 2012 IEEE 13th International Conference on High Performance Switching and Routing, Jun. 24, 2012, 6 pages, IEEE.

McKeown, Nick, et al., "OpenFlow: Enabling Innovation in Campus Networks," ACM SIGCOMM Computer Communication Review, Apr. 2008, 6 pages, vol. 38, No. 2, ACM.

Nygren, Anders, et al., OpenFlow Switch Specification, Version 1.3.4 (Protocol version 0x04), Mar. 27, 2014, 84 pages, Part 1 of 2, Open Networking Foundation.

Nygren, Anders, et al., OpenFlow Switch Specification, Version 1.3.4 (Protocol version 0x04), Mar. 27, 2014, 87 pages, Part 2 of 2, Open Networking Foundation.

Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.

Pfaff, Ben, et al., "OpenFlow Switch Specification," Sep. 6, 2012, 128 pages, The Open Networking Foundation.

Tung, YE, et al., "A flow caching mechanism for fast packet forwarding," Computer Communications, Apr. 19, 2001, 6 pages, Elsevier.

Zadnik, Martin, et al., "Evolution of Cache Replacement Policies to Track Heavy-hitter Flows," ANCS'10, Oct. 25-26, 2010, 2 pages, ACM, La Jolla, CA, USA.

* cited by examiner

PACKET KEY PARSER FOR FLOW-BASED FORWARDING ELEMENTS

BACKGROUND

Many current enterprises have large and sophisticated networks comprising switches, hubs, routers, servers, workstations and other network devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components.

In response, there is a growing movement, driven by both industry and academia, towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Typically, the shared network switching elements are software switching elements. A software switching element brings many features that are standard in a hardware switch to virtualized environments. The software switching element can also be more flexible than the hardware switch. For instance, the software switching element can be programmed to emulate a traditional switch pipeline or can be programmed to extend for new models.

One of the main challenges in developing such a software switching element is performance. A hardware switch has application-specific integrated circuits (ASICs) that are specifically designed to support in-hardware forwarding. The problem with a software switch is that it operates on a host (e.g., x86 box), such as a hypervisor. Thus, methods for increasing the performance of the software switching element are needed.

BRIEF SUMMARY

Some embodiments provide a forwarding element that parses a packet to selectively extract a set of header field values for a flow key. The forwarding element then uses the flow key to find a matching flow entry to process the packet. In some embodiments, the forwarding element chooses the set of header values following the match pattern of a set of one or more flow entries. That is, instead of extracting all header values, the forwarding element chooses certain values depending on the match fields of the set of flow entries. By selectively extracting certain values, the forwarding element can generate flow keys that consume less memory, which in turn improves the forwarding element's performance. The performance may also be improved because the forwarding element is extracting fewer pieces of data and performing its lookup operation with smaller flow keys.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it should be clear that the invention is not limited to the embodiments set forth and that the invention may be practiced without some of the specific details and examples discussed.

Embodiments described herein provide a forwarding element that parses a packet to selectively extract a set of header field values for a flow key. The forwarding element then uses the flow key to find a matching flow entry to process the packet. In some embodiments, the forwarding element chooses the set of header values following the match pattern of a set of one or more flow entries. That is, instead of extracting all header values, the forwarding element chooses certain values depending on the match fields of the set of flow entries.

By selectively extracting certain values, the forwarding element can generate flow keys that consume less memory, which in turn improves the forwarding element's performance. The performance may also be improved because the forwarding element is extracting fewer pieces of data and performing its lookup operations with smaller flow keys. One of the motivations using the new extraction algorithm is that it can extract certain values (e.g., input port, Ethernet type, protocol, and TCP ports) from packet. This can be very helpful for IPv6 that has large addressees and generates larger keys.

Figure 1:
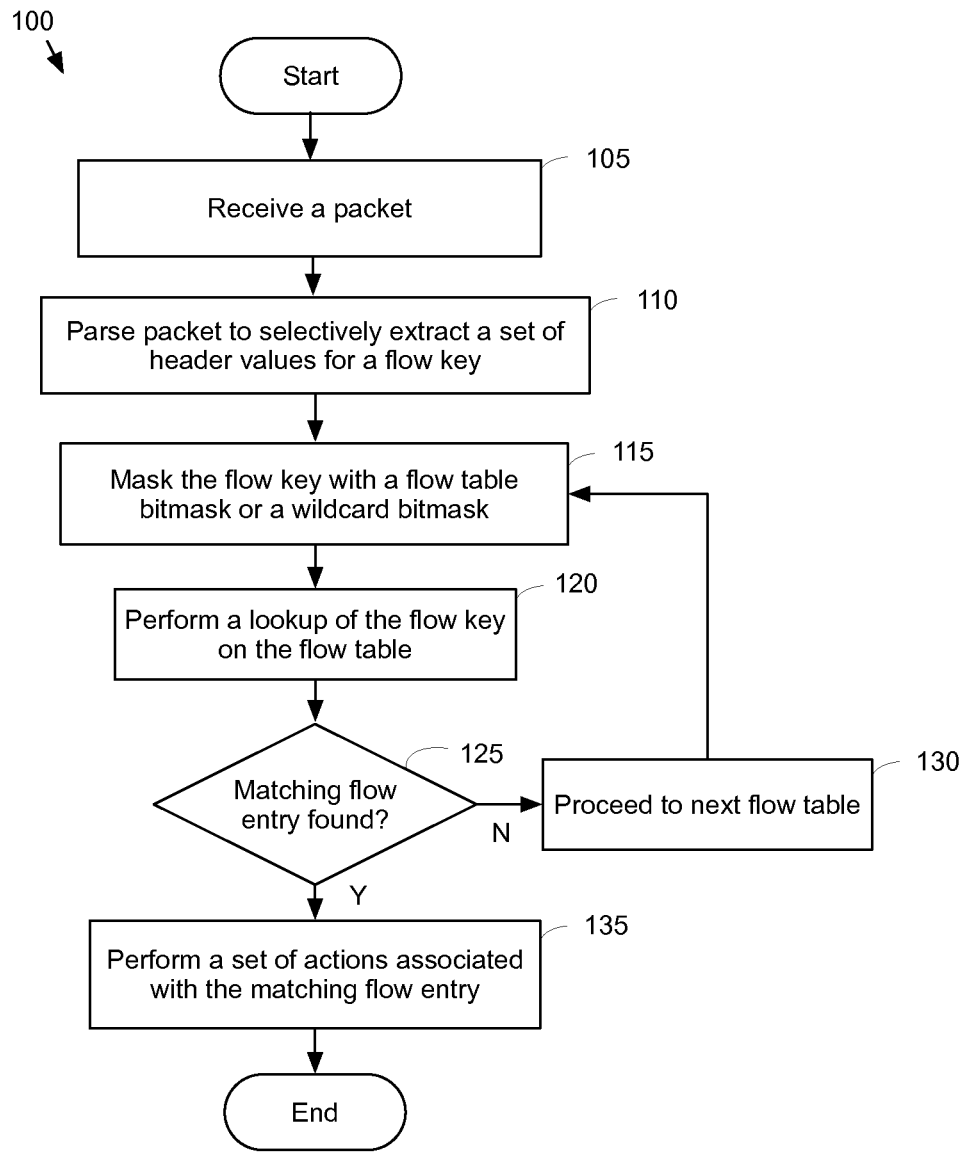
FIG. 1 conceptually illustrates a process that some embodiments implement to selectively extract a set of header values for a flow key.

FIG. 1 conceptually illustrates a process 100 that some embodiments implement to parse a packet in order to define a flow key. Specifically, the process 100 receives the packet as input data and parses the packet header to build a flow key data structure. The flow key data structure is then used to search one or more flow tables to find a matching flow entry. In some embodiments, the process 100 is performed by a forwarding element (e.g., a software virtual switch).

As shown, the process 100 begins when it receives (at 105) a packet. The packet might be sent from a virtual machine or other container (e.g., a Namespace, or similar container) operating on the same physical machine as the device, received from another forwarding element (e.g., through a tunnel), or received from a physical machine separate from the forwarding element. The process 100 then parses (at 110) the packet to selectively extract a set of header values from the packet. Different embodiments use different techniques to specify a flow key for a packet. In some embodiments, the process 100 chooses certain values based on one or more flow tables that the packet may be matched against. That is, the process 100 can choose certain values based on the match pattern the one or more flow tables. For instance, if there is only one flow table that matches on several Layer 2 (L2) fields, the process 100 might extract only the corresponding L2 header values from the packet.

Instead of the match pattern of flow tables, the process 100 of some embodiments chooses a set of header values based on the match pattern of different flow entries. For instance, each flow entry may be associated with a wildcard bitmask that specifies which of one or more match fields is not wildcarded. In some embodiments, the process 100 generates a flow key bitmask by computing the union of all such wildcard masks. The process 100 then uses the flow key bitmask to choose certain values when populating a flow key data structure. Thus, the flow key of some embodiments includes the header fields that may be used for any of the possible flow entries.

As shown in FIG. 1, the process 100 of some embodiments masks (at 115) the flow key with a bitmask. In some embodiments, the bitmask is a flow table bitmask that is associated with a flow table. The flow table bitmask represents the match pattern of different flows in that flow table. Alternatively, the process 100 of some embodiments uses a wildcard bitmask to mask the flow key. The wildcard mask informs the forwarding element which bits of a set of match fields in the flow entry are significant when matching against the flow entry.

At 120, the process 100 performs (at 120) a lookup of the flow key (or a subset of the fields of the flow key, determined according to the bitmask) on a flow table to find a matching flow entry. Based on the lookup, the process 100 then determines (at 125) whether there is a matching flow entry in the flow table. In some embodiments, the process performs a lookup by hashing the fields from the flow key according to the bitmask. That is, the forwarding element hashes the fields that will be used for matching against the flow table, and determines if there is a match. Because of the possibility of hash collisions between two flow entries, if a match is found, the forwarding element determines whether the actual values of the fields from the flow key match those for the flow entry that corresponds to the matched hash. However, if no match is found for the hash, then no flow entry will be matched in the flow table, and both processing power and time are saved by avoiding the need to check the full field values against the flow entries of the flow table.

If no matching flow entry is found, the process 100 proceeds (at 130) to the next flow table. The process 100 then returns to operation 115, which is described above, to generate a new flow key mask for the next flow table. However, if a matching flow entry is found, the process 100 performs (at 135) a set of actions associated with that flow entry on the packet. For instance, the process 100 might modify the packet headers, drop the packet, forward the packet by outputting it through a particular port, etc. After performing the set of actions, the process 100 then ends.

Figure 2:
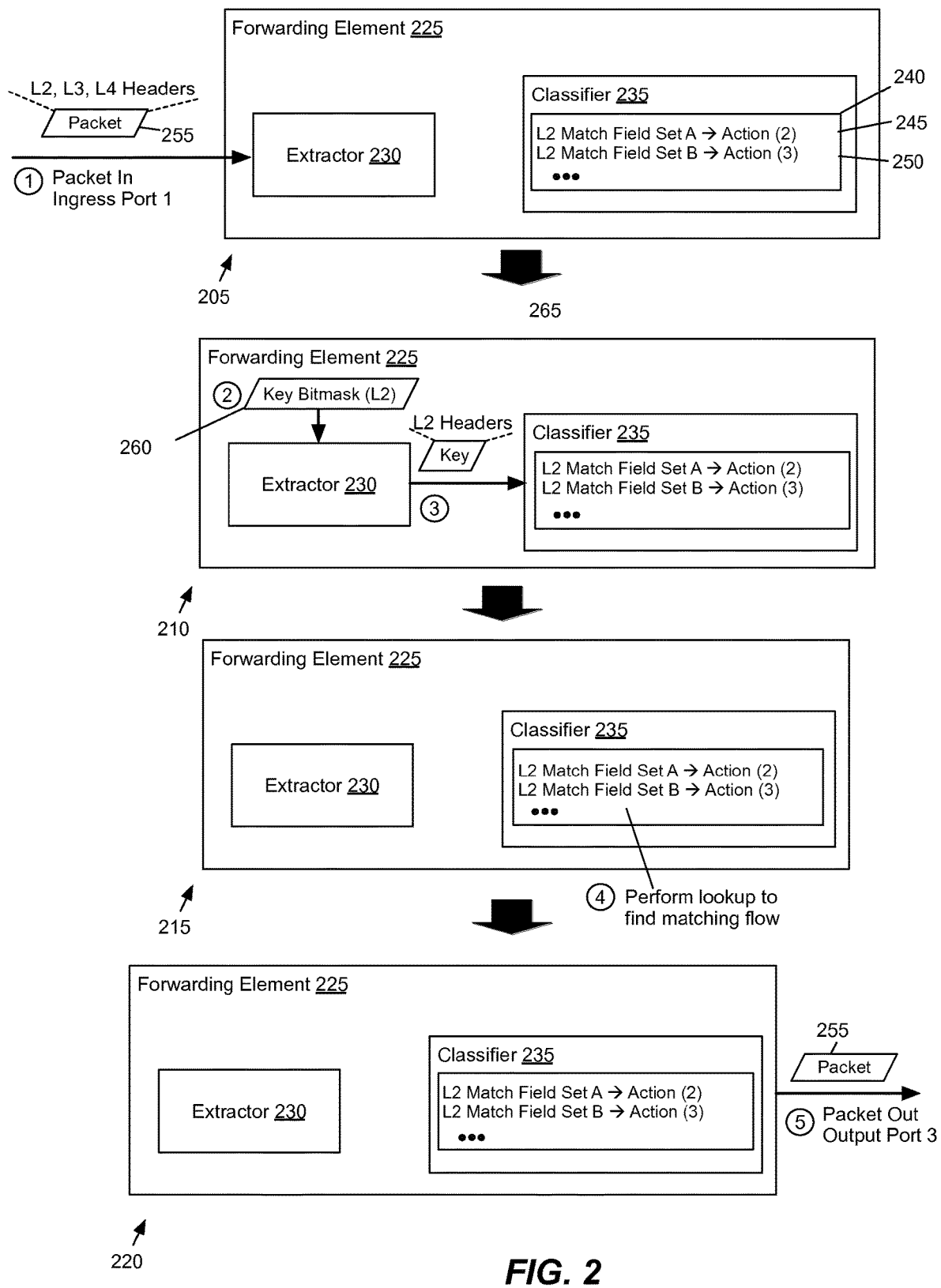
FIG. 2 illustrates an example of a forwarding element that extracts a flow key from a packet and uses the flow key to find a matching flow entry.

Having described an example process, an example of a forwarding element 225 with a novel parser/extractor will now be described by reference to FIG. 2. FIG. 2 illustrates an example of a forwarding element that extracts a flow key from a packet and uses the flow key to find a matching flow entry. In particular, the figure shows the forwarding element extracting only the Layer 2 (L2) header values from the packet because flow entries in a flow table matches on only those L2 fields. Four operational stages 205-220 of the forwarding element 225 are shown in the figure.

In some embodiments, the forwarding element 225 processes packets for one or more machines (also referred to herein as network hosts). A machine can be a virtual machine (VM) or a physical machine (e.g., a hardware machine), or even a container such as a namespace that does not have a separate operating system. The term "packet" is used herein refer to a collection of bits in a particular format that is sent across a network. Typically, the packet includes header, user data, and a trailer. The header of a packet includes control information that is necessary for the delivery network to deliver the packets from the node that transmits the data packets to the node to which the packets are to be delivered. The user data of the packet is data that is to be delivered from one node to another. The user data is also called a payload. A data packet may include headers of one or more communication protocols. When a data packet includes more than one header, the outer-most header is followed by other headers. The innermost header is usually the last header of the headers before the payload of the packet. For the network that implements the protocol of the outer-most header of a packet, the network considers only the outer-most header of the packet as the header and the other headers and the user data of the packet are together considered as the payload of the packet. Also, it should be understood that the term "packet" may be used herein to refer to various formatted collections of bits that may be sent across a network, such as Ethernet frames, TCP segments, UDP datagrams, IP packets, etc.

The forwarding element 225 can be a Layer 2 switch or a Layer 3 router, in some embodiments. The forwarding element of some embodiments is a hardware forwarding element or a software forwarding element. The hardware forwarding element of some embodiments has application-specific integrated circuits (ASICs) that are specifically designed to support in-hardware forwarding. Software forwarding elements of some embodiments may operate on a standard computing device (e.g., an x86 box). In some embodiments, the software forwarding element operates within the virtualization software (e.g., hypervisor, virtual machine monitor, host operating system kernel, etc.) of a host machine that hosts virtual machines or other containers.

In the example of FIG. 2, the forwarding element includes an extractor 230 and a classifier 235. The extractor 230 receives a packet and analyzes its header to extract values from the packet. The extractor of some embodiments is essentially a parser that builds a flow key data structure by analyzing the packet header. In some embodiments, the extractor 230 generates the flow key by choosing a set of values based on wildcard match pattern of one or more flow tables. As an example, the extractor of some such embodiments computes a flow key bitmask by calculating the union of all the flow table masks (e.g., subtable masks). In some embodiments, the extractor 230 generates the flow key by choosing a set of values based on wildcard match pattern of one or more different flow entries. As another example, the extractor of some such embodiments computes a flow key bitmask by calculating the union of all the wildcard masks of the different flow entries.

In some embodiments, the classifier 235 receives the flow key and uses it to perform packet classification. In some embodiments, the classification entails finding a matching flow entry in a flow table. Each flow entry may be fully specified (i.e., may match against all of the fields in the flow key), or may contain one or more match fields that are wildcarded (i.e., only matches against a subset of the fields in the flow key). In finding a matching flow, the classifier might match various sets of fields from the flow key against flow tables. As an example, the classifier might first attempt to find a match in a first flow table for a first set of values from the flow key. If the lookup fails, the classifier might then attempt to find a match in a second flow table for a second, different set of values from the flow key. In some embodiments, the classifier uses a flow table mask to select these sets of values from the flow key. The flow table mask informs the forwarding element which bits (e.g., of one or more header values) should be used to perform the lookup operation on the flow table. Alternatively, in some embodiments, the classifier performs the lookup based on a wildcard mask associated with a flow entry. The wildcard mask of some embodiments informs the forwarding element which bits (e.g., of one or more header values) should be used to compare against the flow entry.

In some embodiments, the classifier performs these lookup operations by generating a hash for each set of fields of the flow key. That is, for a first table, the classifier hashes a first set of values to generate a first hash, and compares this hash to hash values for each of the flow entries. If a match is found, then the full header values are compared to those for the flow entry to ensure that the match is not the result of a hash collision. If no match is found on the first table, then the classifier does not need to perform the full comparison, and can instead move on to generate a second hash of the second set of values from the flow key for the second flow table.

Having described several components of the forwarding element 225, the operations of these components will now be described by reference to the four stages 205-220 that are illustrated in FIG. 2. The first stage 205 illustrates the forwarding element 225 receiving a packet 255. The packet is received through ingress port 1 and is received by the extractor 230. The packet has Layer 2 (L2) data link layer, Layer 3 (L3) network layer, and Layer 4 (L4) transport layer headers.

The second stage 210 shows the extractor 230 parsing the packet 255 to extract header values for a flow key data structure. Here, the extractor does not extract all the header values, namely the L2, L3, and L4 headers. Instead, the extractor only extracts pieces of data that are of interest, namely the L2 header values. This is because flows or rules 245 and 250 in the flow table 240 do not match on any other fields besides the L2 fields. For instance, the flow entry 245 is associated with a first set of L2 match field values, and the flow entry 250 is associated with a second set of L2 match field values. In some embodiments, the extractor uses a flow key bitmask 260 to selectively extract certain values (e.g., the L2 header values).

In the third stage 215, the classifier 235 has received the flow key. The classifier 235 then uses the flow key to find a matching flow from the flow table 240. In some embodiments, the classifier generates a hash value from the L2 header values of the flow key. The classifier then compares the hash against the hash values associated with the flow entries 245 and 250. The lookup operation resulted in a matching hash with the flow entry 250, at which point the classifier ensures that the L2 header values of the flow key match those specified by the flow entry 250, and are not a different set of L2 header values that result in the same hash value. In other embodiments, the classifier does not use the hashing, and instead just checks the flow key values against those of the flow entries in the flow table to find a match.

The flow entry 250 specifies that any packet that has the same set of L2 match field values should be output to port 3. Following this rule, in the fourth stage 220, the forwarding element 225 outputs the packet through port 3.

Several more detailed examples of parsing and processing packets are described below. Specifically, Section I describes an example software forwarding element that implements some embodiments of the invention. Section II then describes several additional examples of how the forwarding element chooses certain values when creating flow key data structures. This is followed by Section III, which describes an electronic system for implementing some embodiments of the invention.

I. Example Switching Element

As method above, the forwarding element of some embodiments receives a packet and processes the packet by selectively extracting a set of header values for a flow key. In some embodiments, the forwarding element is a software or virtual switch. An example of such a software switch will not be described by reference to FIG. 3.

Figure 3:
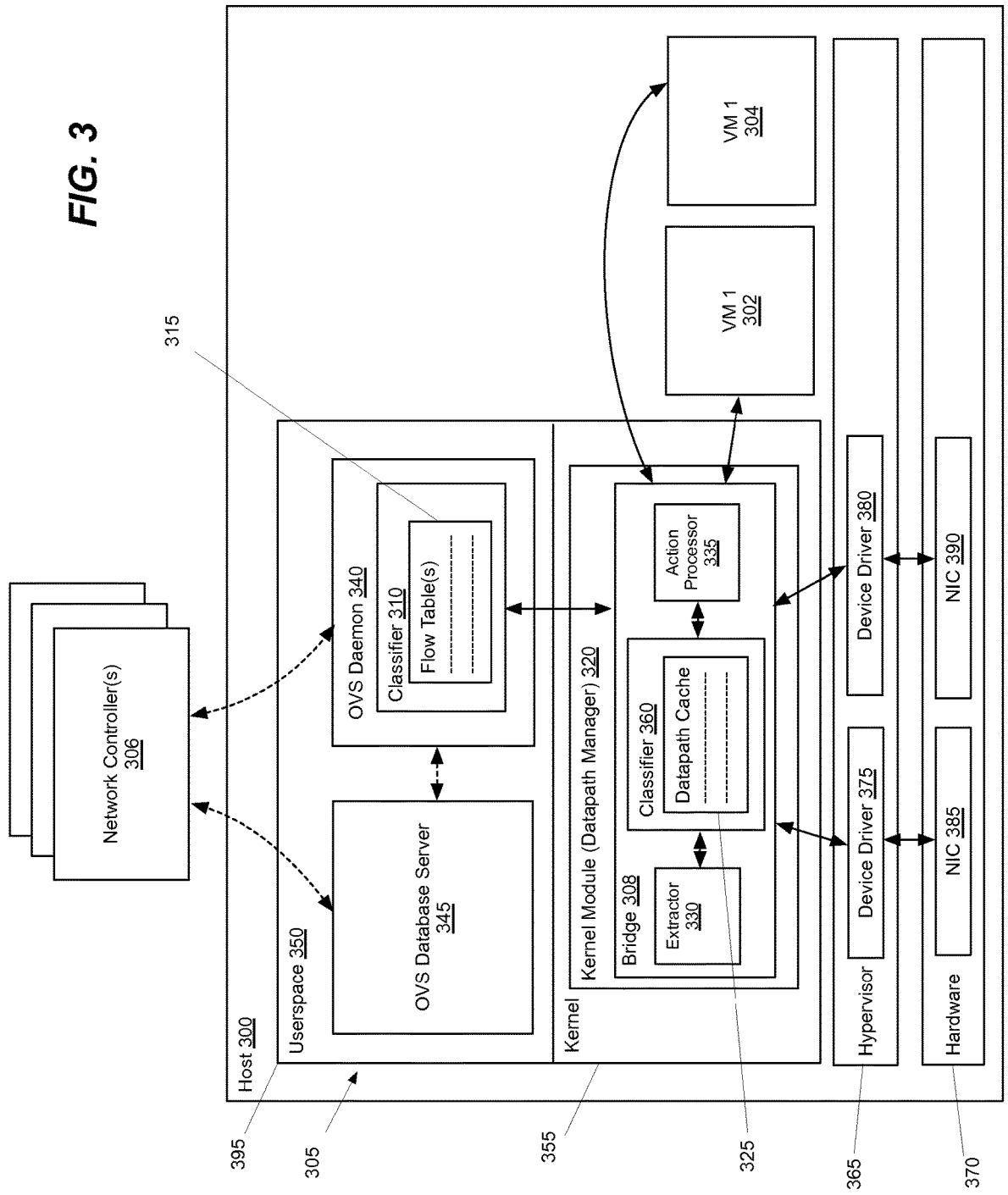
FIG. 3 conceptually illustrates an architectural diagram of a software forwarding element of some embodiments.

FIG. 3 conceptually illustrates an architectural diagram of a software forwarding element 305 of some embodiments that is implemented in a host 300. In this example, the software forwarding element 305 includes several components. These components includes an Open vSwitch (OVS) kernel module 320, which runs in the kernel 355, and an OVS daemon 340 and an OVS database server 345, which run in the user space 350. In some embodiments, these are the kernel and user space of a VM 395. While shown in this and subsequent examples as operating within a VM, it should be understood that in some embodiments the software forwarding element 305 operates in the virtualization software of the host machine 300 (i.e., the kernel and user space of a hypervisor, virtual machine monitor, etc.).

As shown in FIG. 3, the host 300 includes hardware 370, hypervisor 365, and VMs 302 and 304. The hardware 370 may include typical computer hardware, such as processing units, volatile memory (e.g., random access memory (RAM)), nonvolatile memory (e.g., hard disc drives, optical discs, etc.), network adapters, video adapters, or any other type of computer hardware. As shown, the hardware 370 includes NICs 385 and 390, which are typical network interface controllers for connecting a computing device to a network.

The hypervisor 365 is a software abstraction layer that runs on top of the hardware 370 and runs below any operation system. The hypervisor 365 handles various management tasks, such as memory management, processor scheduling, or any other operations for controlling the execution of the VMs 302 and 304. Moreover, the hypervisor 365 communicates with the VM 395 to achieve various operations (e.g., setting priorities). In some embodiments, the hypervisor 365 is one type of hypervisor (Xen, ESX, or KVM hypervisor) while, in other embodiments, the hypervisor 365 may be any other type of hypervisor for providing hardware virtualization of the hardware 370 on the host 300.

As shown, the hypervisor 365 includes device drivers 375 and 380 for the NICs 385 and 390, respectively. The device drivers 375 and 380 allow an operating system to interact with the hardware of the host 300. VMs 302 and 304 are virtual machines running on the hypervisor 365. As such, the VMs 302 and 304 run any number of different operating systems. Examples of such operations systems include Linux, Solaris, FreeBSD, or any other type of UNIX based operating system. Other examples include Windows based operating systems as well.

In some embodiments, the VM 395 is a unique virtual machine, which includes a modified Linux kernel, running on the hypervisor 365. In such cases, the VM 395 may be referred to as domain 0 or dom0 in some embodiments. The VM 395 of such embodiments is responsible for managing and controlling other VMs running on the hypervisor 365 (e.g., VMs 390 and 395). For instance, the VM 395 may have special rights to access the hardware 370 of the host 300. In such embodiments, other VMs running on the hypervisor 365 interact with the VM 395 in order to access the hardware 370. In addition, the VM 395 may be responsible for starting and stopping VMs on the hypervisor 365. The VM 395 may perform other functions for managing and controlling the VMs running on the hypervisor 365. Some embodiments of the VM 395 may include several daemons (e.g., Linux daemons) for supporting the management and control of other VMs running on the hypervisor 365. Since the VM 395 of some embodiments is manages and controls other VMs running on the hypervisor 365, the VM 395 may be required to run on the hypervisor 365 before any other VM is run on the hypervisor 365.

As shown in FIG. 3, the VM 395 includes a kernel 355 and a user space 350. In some embodiments, the kernel is the most basic component of an operating system that runs on a separate memory space and is responsible for managing system resources (e.g., communication between hardware and software resources). In contrast, the user space is a memory space where all user mode applications may run.

As shown, the user space 350 of the VM 395 includes the OVS daemon 340 and the OVS database server 345. Other applications (not shown) may be included in the user space of the VM 395 as well. The OVS daemon 340 is an application that runs in the background of the user space of the VM 395. The OVS daemon 340 of some embodiments receives switch configuration from the network controller 306 (in a network controller cluster) and the OVS database server 345. The management information includes bridge information, and the switch configuration includes various flow entries. These flow entries are stored in the flow table 315. Accordingly, the software forwarding element 305 may be referred to as a managed forwarding element.

In some embodiments, the OVS daemon 340 communicates with the network controller using the OpenFlow Protocol. In some embodiments, the OVS database server 345 communicates with the network controller 306 and the OVS daemon 340 through a database communication protocol (e.g., OVS database protocol). The database protocol of some embodiments is a JavaScript Object Notation (JSON) remote procedure call (RPC) based protocol.

The OVS database server 345 is also an application that runs in the background of the user space of the VM 395. The OVS database server 345 of some embodiments communicates with the network controller 306 in order to configure the OVS forwarding element (e.g., the OVS daemon 340 and/or the OVS kernel module 320). For instance, the OVS database server 345 receives management information from the network controller 306 for configuring bridges, ingress ports, egress ports, QoS configurations for ports, etc., and stores the information in a set of databases.

As illustrated in FIG. 3, the kernel 355 includes the OVS kernel module 320. This module processes and routes network data (e.g., packets) between VMs running on the host 300 and network hosts external to the host (i.e., network data received through the NICs 385 and 390). For example, the OVS kernel module 320 of some embodiments routes packets between VMs running on the host 300 and network hosts external to the host 300 couple the OVS kernel module 320 through a bridge 308.

In some embodiments, the bridge 308 manages a set of rules (e.g., flow entries) that specify operations for processing and forwarding packets. The bridge 308 communicates with the OVS daemon 340 in order to process and forward packets that the bridge 308 receives. For instance, the bridge 308 receives commands, from the network controller 306 via the OVS daemon 345, related to processing and forwarding of packets.

In the example of FIG. 3, the bridge 308 includes an extractor 330, a classifier 360, and an action processor 335. The extractor 330 receives a packet and parses the packet to extract or strip a set header values from the packet. The set of header values is then used to define a flow key. In some embodiments, the extractor 330 chooses a set of values based on the match pattern of one or more flow tables. Alternatively, the extractor of some embodiments chooses a set of header values based on the match pattern of a set of flows. As an example, the forwarding element might generate a number of different wildcard masks for different flows. The extractor then computes a flow key bitmask by calculating the union of all the wildcard card masks. Upon specifying the flow key, the extractor passes the flow key to the classifier 360.

The classifier 360 or kernel module accesses the datapath cache 325 to find matching flows for different packets. The datapath cache 325 contains any recently used flows. The flows may be fully specified, or may include one or more match fields that are wildcarded. When the classifier 360 receives the header values, it tries to find a flow or rule installed in the datapath cache 325. If it does not find one, then the control is shifted to the OVS Daemon 340. One main distinction between the fast path cache 325 and the set of flow tables 315 is that there is at most only one matching flow entry in the fast path cache 325.

If the classifier 360 finds a matching flow, the action processor 335 receives the packet and performs a set of action that is associated with the matching flow entry. The action processor 335 of some embodiment also receives, from the OVS daemon 340, a packet and a set of instructions to perform on the packet. For instance, when there is no matching flow in the datapath cache 325, the packet is sent to the OVS daemon 340. The OVS daemon 340 may generate a flow and install that flow in the datapath cache 325. The OVS daemon 340 might also send the packet to the action processor 335 with the set of actions to perform on that packet.

The OVS daemon 340 is a component of the software forwarding element 305 that makes forwarding and other packet processing decisions. Each time there is a miss in the datapath cache 325, the OVS daemon 340 generates a new flow entry to install in the cache. In some embodiments, the OVS daemon operates in conjunction with its own separate classifier 310 to find one or more matching flow entries from a set of one or more flow tables 315. However, different from the classifier 360, the OVS daemon's classifier can perform one or more resubmits. That is, a packet can go through the daemon's classifier multiple times to find several matching flow entries from one or more flow table 315. When multiple matching flow entries are found, the datapath flow generator 310 of some embodiments generates one consolidated flow entry to store in the datapath cache 325. In some embodiments, the forwarding element allows flows with wildcards to be specified in the flow table 315. However, different from the datapath flow entries, these flow entries are not dynamically generated on the fly (e.g., in response to a miss in the datapath).

When a flow entry is generated, the user space or OVS daemon of some embodiments sends the generated flow entry to the kernel module (e.g., the classifier 360) along with the wildcard mask. The wildcard mask informs the kernel module which bits of a set of match field values in the flow are significant when matching. This means that the remaining bits (i.e., the wildcarded bits) should be ignored. When generating a hash of the header values, the kernel module of some embodiments only hashes bits that are significant. For instance, the kernel module might take the match field values of a flow entry or rule, and zero out all the insignificant bits using the wildcard mask and store it in a hash table. In some embodiments, when the packet is received, the kernel module uses the wildcard mask to zero out all the insignificant bits of the packet. Then, it computes the hash from the packet. Thereafter, the kernel module compares that hash to hashes that were computed for different flows. The kernel module might hash the same packet multiple times based on different match patterns of different hash tables. Hence, the kernel module uses the wildcard mask (e.g., which was generated in the user space) to specify which bits need to be zeroed before it computes the hash.

In the example described above, the forwarding element generates and pushes flows from the user space to the datapath cache. In some embodiments, the forwarding element processes packets using a cache hierarchy. In some embodiments, the cache hierarchy includes an exact match cache and a non-exact match cache. The exact match cache stores flows or rules with match fields that are fully specified, while the non-exact match cache stores other flows that includes one or more match fields that are wildcarded and/or a portion of one or more match fields that is wildcarded.

In some embodiments, when a forwarding element receives a packet, the forwarding element first consults the exact-match cache to find a matching microflow. If a match is found, the forwarding element processes the packet using a matching flow entry. If there is a miss in the exact match cache, the forwarding element may consult the megaflow cache. If there is a miss in the megaflow cache, the forwarding element may examine one or more flow tables to generate a new flow to store in the cache and process the packets.

In some embodiments, the megaflow cache is populated on demand from consulting one or more of the flow tables. In some embodiments, the exact match cache is populated on demand from the consulting megaflow cache. For instance, assuming most packets are part of an existing flow, the forwarding element benefits from the performance advantage of a single flow table lookup. If it misses, as the packet is still covered by the megaflow cache, the forwarding element still benefits from megaflow's performance advantage by not requiring full translation. The operations of the parser/extractor described herein may be applied to both the megaflow and exact match caches in some embodiments.

It should be understood that the architecture of FIG. 3 is an example architecture and that different embodiments can include different sets of components. The naming of the various components is arbitrary and can change from one implementation to another. Also, the architecture shows two different layers (e.g., the kernel layer and the user space layer) performing various operations. In some embodiments, these operations occur at just one layer (e.g., at the user space layer) or are further split into other layers.

II. Example Packet Processing Operations

In some embodiments, the forwarding element specifies a flow key by choosing one or more field values from a packet header. As mentioned above, forwarding element of some embodiments chooses a set of header values based on the match pattern of a set of flows.

Figure 4:
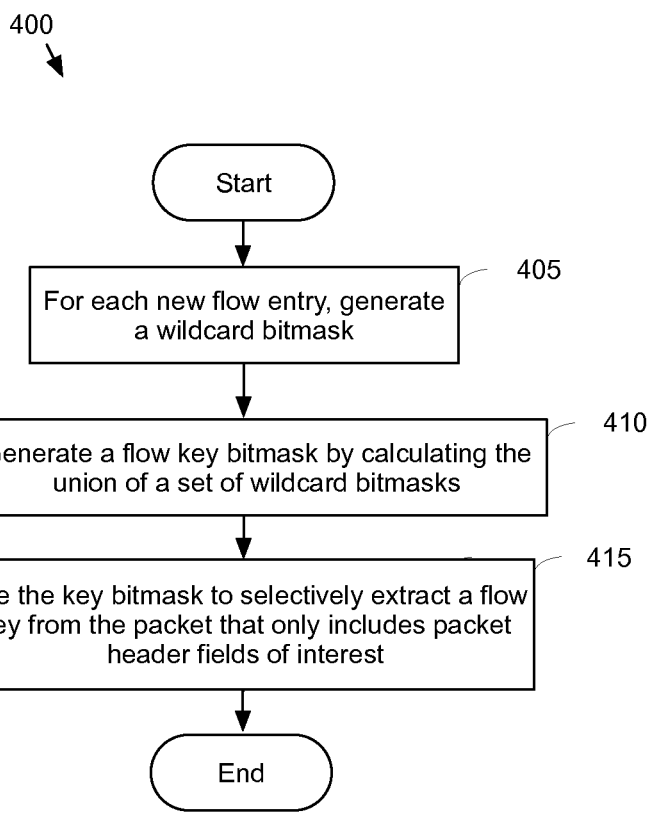
FIG. 4 conceptually illustrates a process that some embodiments implement to generate a set of wildcard bitmasks and use the set of wildcard bitmask to generate a flow key bitmask.

FIG. 4 conceptually illustrates a process 400 that some embodiments implement to create a flow key data structure from a packet. In particular, the process 400 generates a set of wildcard masks and uses the set of wildcard masks to generate a flow key bitmask. The process 400 then uses the flow key bitmask to choose (e.g., extract) a set of values for the flow key data structure. In some embodiments, the process 400 is performed by a forwarding element.

As shown in FIG. 4, the process 400 begins by generating (at 405) a wildcard bitmask for each new flow entry. The wildcard bitmask informs the forwarding elements which field(s), or a portion of the field(s) is wildcarded. In some embodiments, when a packet is received, the process dynamically generates a flow entry that is associated with a wildcard mask. The process 400 then caches the flow entry and processes any subsequent packets that have header values (e.g., bits) that match the flow entry's non-wildcard match fields. In other words, each subsequent packet does not have to have header values that match all of the flow entry's match fields but only its non-wildcard fields. The wildcard mask informs the process 400 which bits of a set of match field values in the flow are significant when matching. This means that the remaining bits (i.e., the wildcarded bits) should be ignored.

At 410, the process 400 generates a flow key bitmask by combining unique elements from different wildcard masks. In some embodiments, the process 400 calculates the union of a set of wildcard bitmasks. That is, the process 400 specifies a flow key bitmask that has one or more distinct fields from the set of wildcard masks. In some embodiments, the flow key bitmask can specify which portion of a particular field should be included in the flow key. For instance, the flow key bitmask may specify extracting a portion of the 16-bit TCP port number (e.g., the two-most significant bits or the three least significant bits) instead of the entire port number. As another example, the flow key bitmask may specify extracting a portion of the IP address (e.g., a portion of the 32-bit IPv4 address, a portion of the 128-bit IPv6 address). The chosen portion or bits can be contiguous bits or non-contiguous.

After generating the flow key bitmask, the process 400 uses (at 415) it to selectively extract a flow key from the packet that only includes packet header fields of interest. Instead of the header values, the process of some embodiments may choose one or more pieces of metadata or register values associated with the packet. For instance, the process might identify an ingress port number and populate the flow key with the port number. One of the motivations for using the new extraction algorithm is that it can extract certain values (e.g., input port, Ethernet type, protocol, and TCP ports) from a packet. This can be very helpful for IPv6 that has large addressees and generates larger keys.

After populating the flow key data structure, the process 400 ends. Some embodiments perform variations on the process 400. The specific operations of the process 400 may not be performed in the exact order shown and described. The specific operations may not be performed in one continuous series of operations, and different specific operations may be performed in different embodiments.

Figure 5:
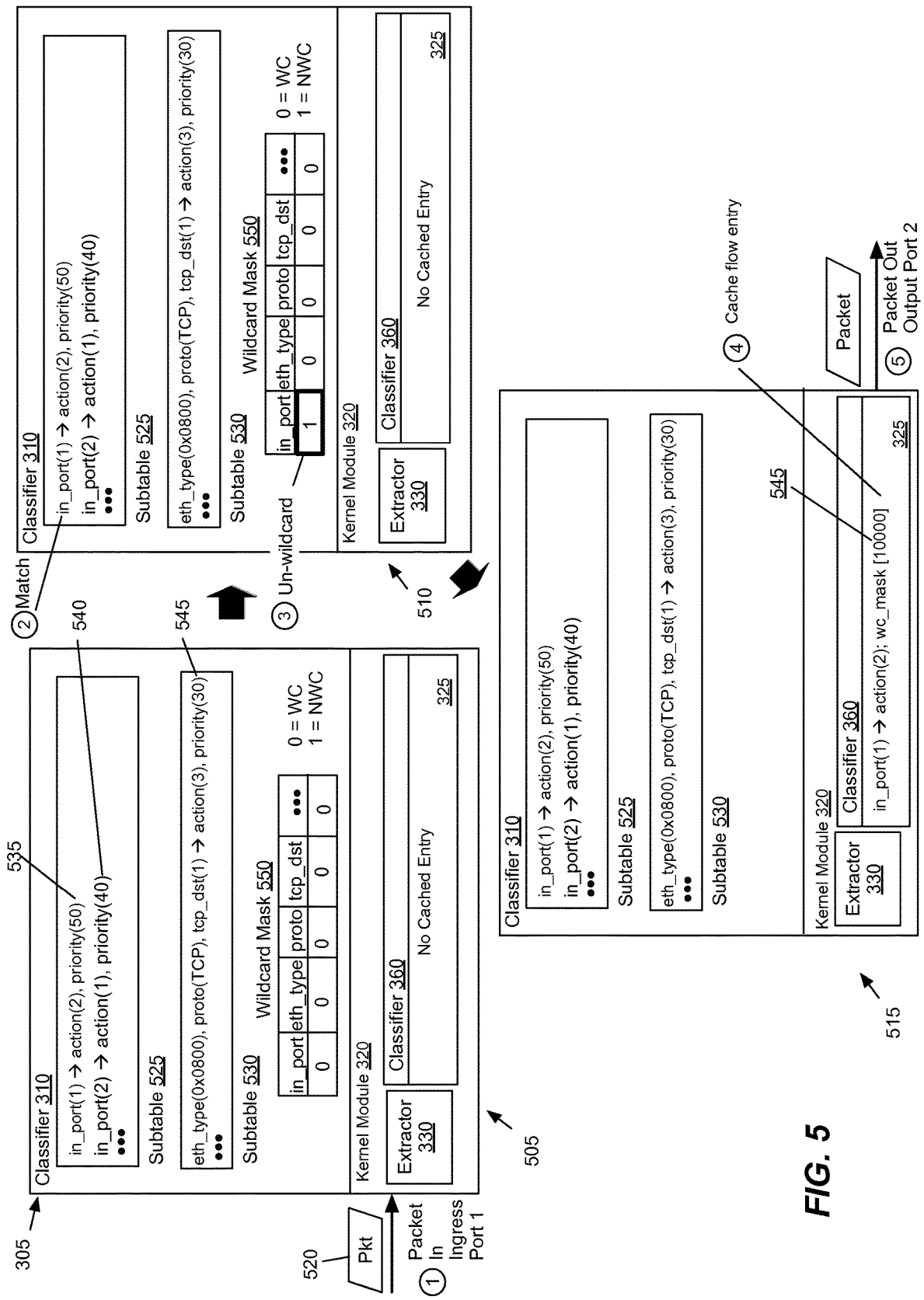
FIG. 5 illustrates an example of a forwarding element that generates a wildcard bitmask for a flow entry.

In the example described above, the process generates a set of wildcard masks and uses it to generate a flow key bitmask. An example forwarding element that generates such masks will now be described by reference to FIGS. 5-8. FIG. 5 illustrates an example of a forwarding element 305 that generates a wildcard bitmask for each new flow entry that it stores in a cache. Three operational stages 505-515 of the forwarding element are shown in the figure. In some embodiments, the forwarding element 305 is the same as the one described above by reference to FIG. 3.

As shown in FIG. 5, the forwarding element 305 includes a number of flow tables. In some embodiments, at flow table creation time, the forwarding element organizes flow entries (i.e., rules) into different groups based on what fields (or partial fields) the rules match on (or based on states of a processing pipeline, in which each stage will often have numerous flow entries that match over the same field). In this example, the forwarding element includes two different groups of flow entries in different flow tables (e.g., the subtables 525 and 530). In the illustrated example, one group of flow entries 535 and 540 matches on the ingress port value, and the other group of flow entries 545 matches on Ethernet type, protocol, and TCP destination port number. Note that a single match field can have different match patterns. For instance, an IP address match field (e.g., source or destination) may match on the first eight bits and another IP address match field may match on the first sixteen bits. In some embodiments, the two IP addresses would be in different subtables even though they match on the same match field. When the forwarding element performs its matches, it uses specific sets of bits in some embodiments (e.g., to perform a hash of the specific bits).

The first stage 505 shows the forwarding element 305 receiving a packet 520. As the datapath does not have any flow entries, the control is shifted from the kernel space to the user space. In the second stage 515, the user space's classifier 310 has received the packet. The classifier 310 performs packet classification to find a matching rule for the packet in one of the two subtables 525 and 530. Specifically, in some embodiments the classifier 310 uses a hash function to generate a hash value of the ingress port value. To find the matching hash value, the classifier 310 then compares the generated hash value against the hash values stored for the flow entries in the first subtable 525. If a matching hash is found, then the full ingress port value is compared to the one or more entries with the matching hash value. In this case, the lookup operation resulted in finding a matching flow entry 535.

The second stage 510 shows that the forwarding element 305 also generates a wildcard mask for each new flow entry it caches. In some embodiments, the forwarding element generates the mask by un-wildcarding each match field that was consulted or examined when searching for a matching flow entry. That is, the forwarding element un-wildcards each match field that it used (e.g., looked at) during the generation of the flow entry. This is because the generated flow entry only matches on those non-wildcarded bits. In generating the wildcard mask, the forwarding element of some embodiments initially wildcards some or all match fields. When a packet is received, the forwarding element selects a flow from the flow table and un-wildcards each match field that it consults or examines.

In the example of FIG. 5, the wildcard mask includes one bit for each match field. However, the wildcard mask of some embodiments includes one bit for each bit of each match field. For instance, the wildcard mask may include 16 bits for a 16-bit TCP destination port number, 32-bits for a 32-bit IPv4 address, 128-bits for a 128-bit IPv6 address, etc. In some embodiments, a bit of the match field is wildcarded if the corresponding bit of the wildcard mask is set to zero and un-wildcarded if the corresponding bit is set to one. This is shown in the figure with the key next to the wildcard mask.

As shown in the second stage 510, the forwarding element 305 un-wildcards the bit associated with the ingress port number field because the field was consulted to find a matching flow 535. The third stage 515 shows several example operations performed by the forwarding element 305 after finding a matching rule 535 and generating the wildcard mask 550. Specifically, the kernel module 320 receives the packet from a user space daemon (not shown) with a set of instructions on how to process the packet. Following the set of instructions, the kernel module 320 outputs the packet through one of the ports. The kernel module also receives a flow entry 545 that was generated based on the matching rule 535. The kernel module 320 then installs (e.g., caches) the flow entry in the datapath 325 to process other subsequent similar packets. Different from a microflow, the flow entry is a megaflow that can potentially process a diverse collection of packets as long as each of those packets match on each match field value or a portion thereof (e.g., the bits) that is un-wildcarded.

Figure 6:
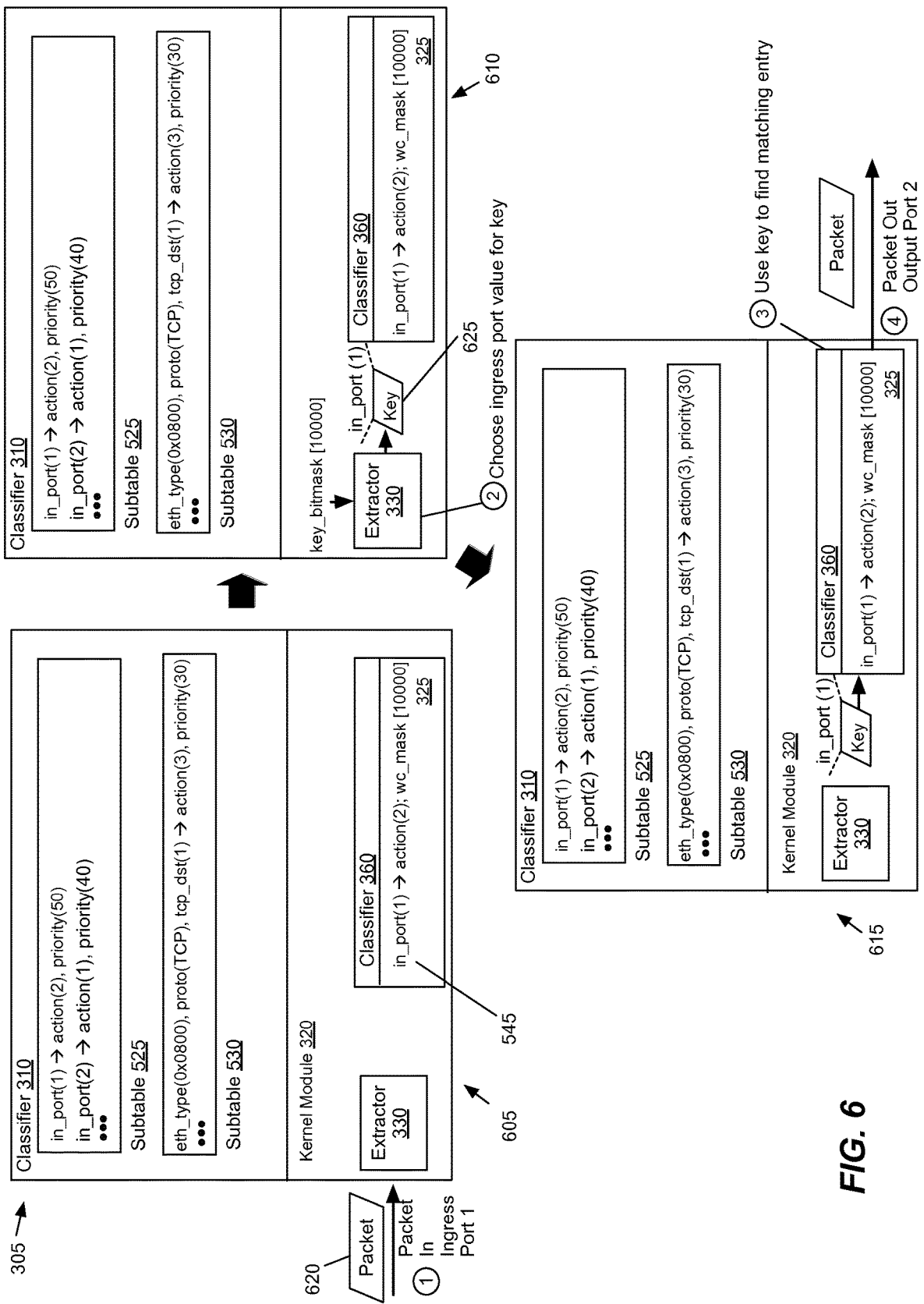
FIG. 6 shows an example of the forwarding element choosing a specific value for a flow key based on the wildcard bitmask.

FIG. 6 shows an example of the forwarding element choosing a specific value for a flow key in accordance with the wildcard bitmask. Three operational stages 605-615 of the forwarding element 305 are shown in the figure. These stages are a continuation of the stages shown in the previous FIG. 5.

In the first stage 605, the forwarding element 305 has installed the flow entry 545 in the datapath 325. The flow entry is associated with the wildcard mask. The first stage 605 shows the forwarding element receiving another packet 620 through the same ingress port. The second stage 610 shows the extractor 330 parsing the packet 620 to populate a flow key data structure 625. In populating, the extractor has generated a flow key bitmask based on the wildcard mask. As there is only one wildcard mask, the flow key bitmask is the same as the wildcard mask. The flow key bitmask specifies that the bits associated with the ingress port value are un-wildcarded and the remaining bits associated with other fields are all wildcarded. Following this specification, the extractor chooses the ingress port value for the flow key data structure.

The third stage 615 shows the forwarding element 305 finding a matching flow to process the packet 620. Specifically, the classifier 360 has received the flow key 625. The classifier has also hashed the ingress port number of the flow key. The classifier then performs the lookup by comparing the hash to the one associated with the flow entry 545. In the third stage 615, the lookup operation resulted in a matching hash with the flow entry 545, at which point the classifier confirms that the fields of the flow key (i.e., the ingress port value) match those for the flow entry 545. The cache entry specifies that any packet that has the same ingress port number should be output to port two. Following this rule, the forwarding element 305 outputs the packet 620 through port two.

Figure 7A:
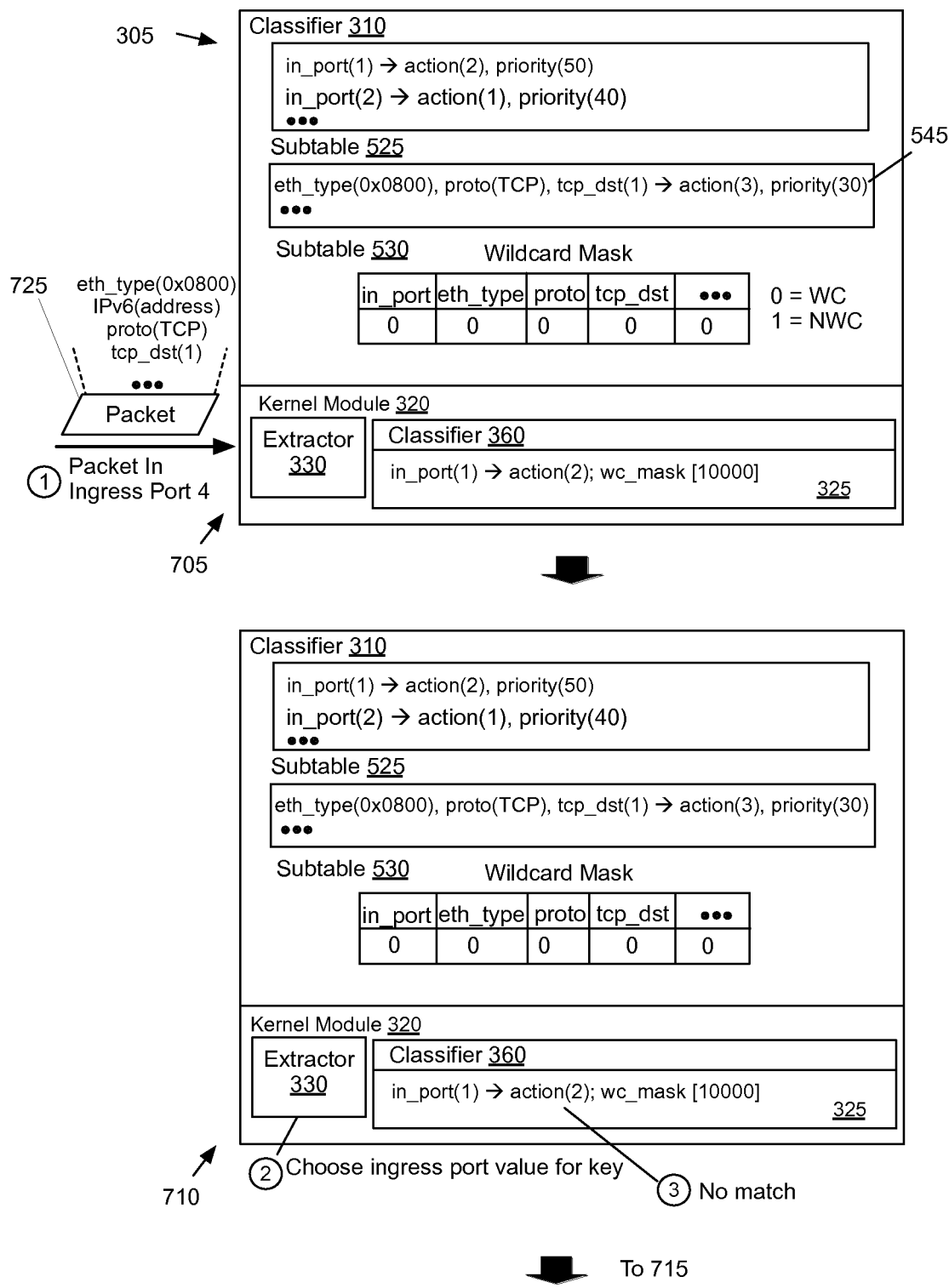
FIGS. 7A-B provide an illustrative example of the forwarding element generating a different wildcard bitmask for another flow entry.
Figure 7B:
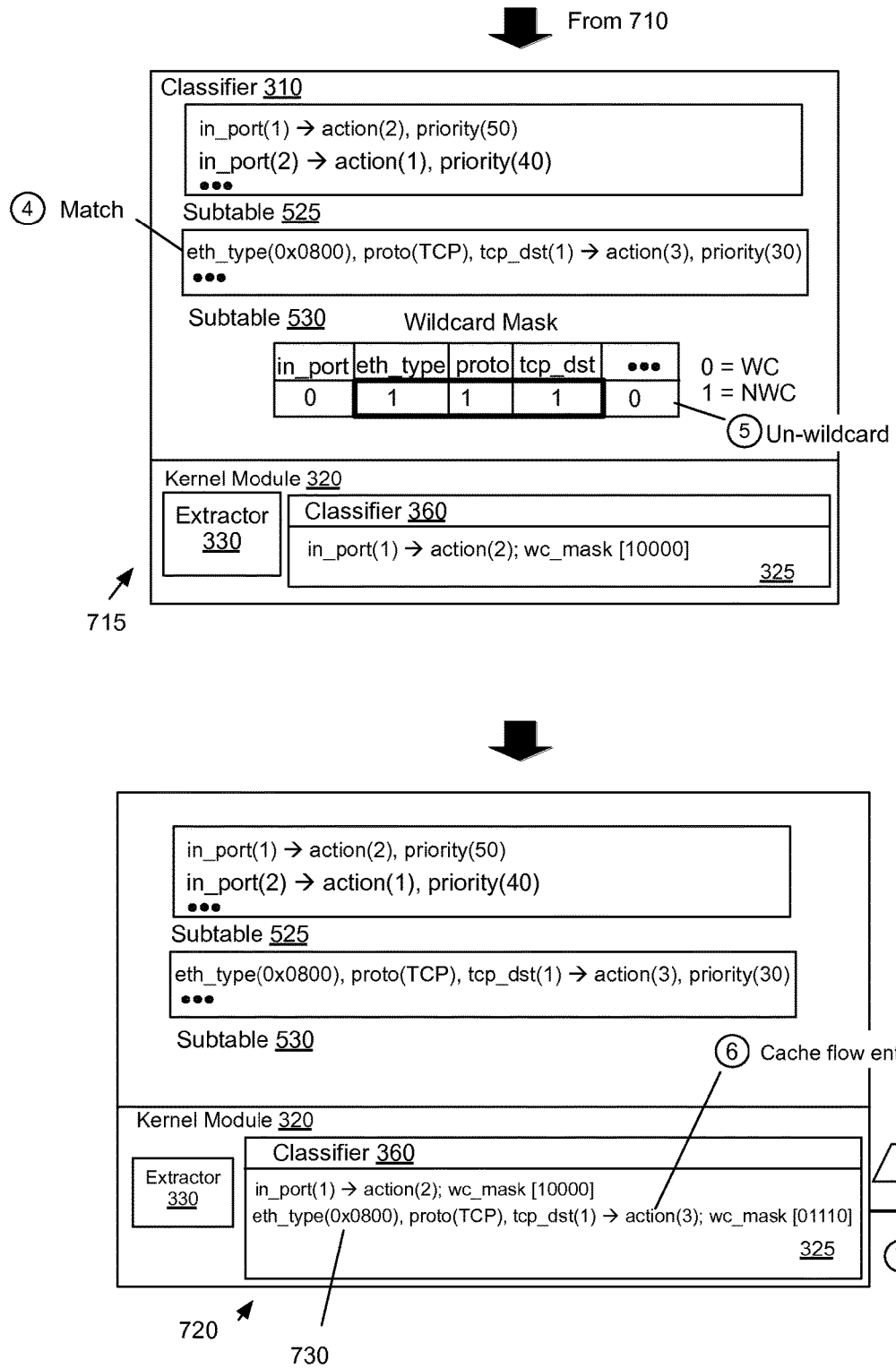

FIG. 7 provides an illustrative example of the forwarding element generating a different wildcard bitmask for another flow entry. Four operational stages 705-720 of the forwarding element 305 are shown in this figure. These stages are a continuation of the ones shown in the previous figure.

The first stage 705 shows the forwarding element receiving yet another packet 725 through a different ingress port. The packet is associated with several header values, including Ethernet type, IPv6 address, protocol, and TCP destination port number. In the second stage 710, the extractor 330 extracts the ingress port number for a flow key. The classifier 360 then uses the key to find a matching flow entry. Here, the classifier has failed to find a matching flow in the datapath 325.

In the third stage 715, the packet processing has shifted from the kernel space to the user space. The user space's classifier 310 has received the packet. The classifier 310 performs packet classification to find a matching rule for the packet in one of the two subtables 525 and 530. Specifically, the classifier 310 of some embodiments uses a hash function to generate a hash value of the Ethernet type, protocol, and TCP destination port number. To find the matching hash value, the classifier 310 then compares the hash against those stored in the second subtable 530. Here, the lookup operation of the second subtable 530 resulted in finding a matching flow entry 545.

The fourth stage 720 shows several example operations performed by the forwarding element 305 after finding a matching rule 545 and generating the wildcard mask 550. Specifically, the kernel module 320 receives the packet from a user space daemon (not shown) with a set of instructions on how to process the packet. Following the set of instructions, the kernel module 320 outputs the packet through one of the ports. The kernel module also receives a flow entry 730 that was generated based on the matching rule 545. The kernel module 320 then installs (e.g., caches) the flow entry 730 in the datapath 325 to process other subsequent similar packets.

Figure 8:
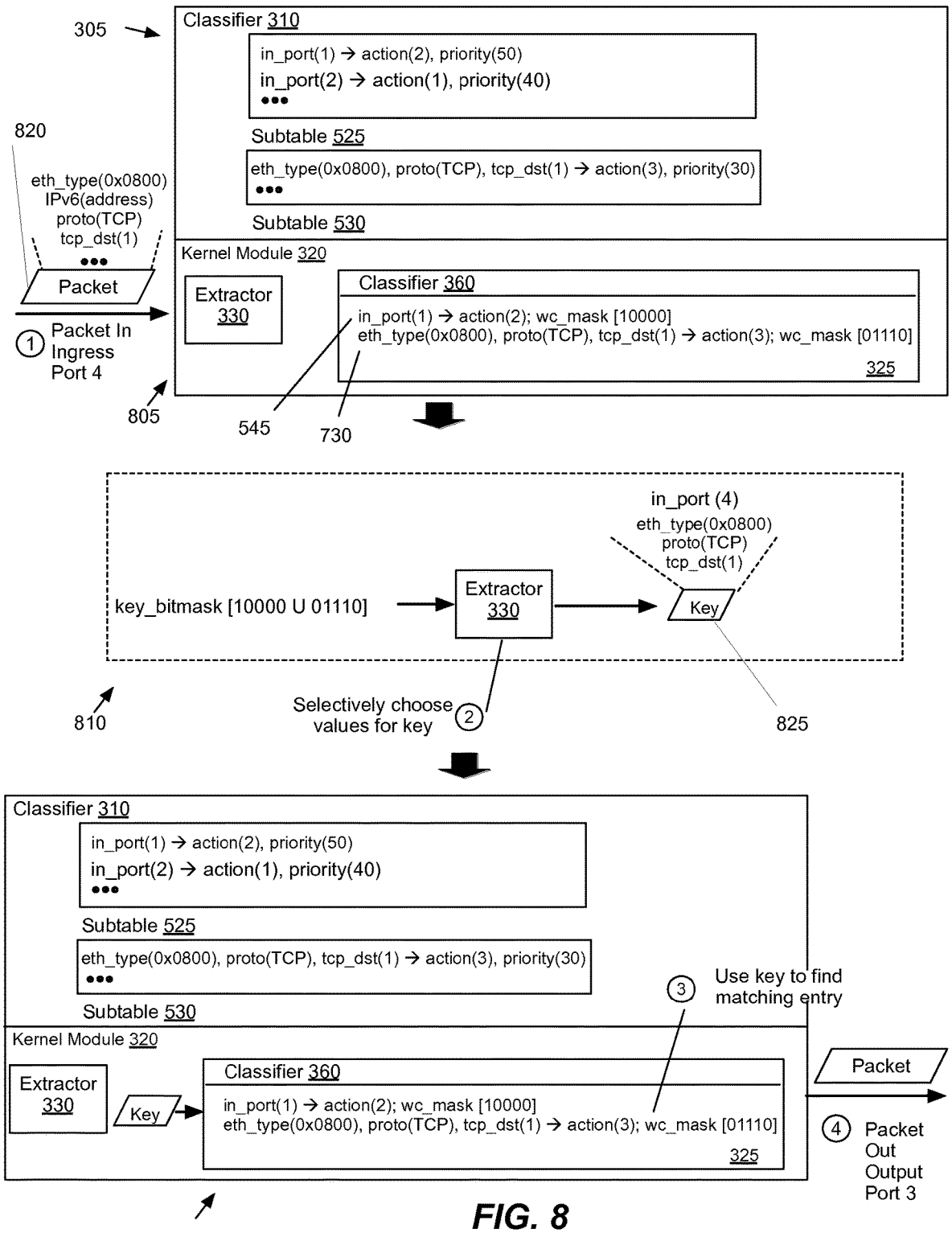
FIG. 8 provides an illustrative example of the forwarding element that generates a flow key bitmask in order to selectively choose several values for a flow key.

FIG. 8 provides an illustrative example of the forwarding element combining different wildcard mask to generate a flow key bitmask, and using the bit mask to choose certain values for a flow key data structure. Three operational stages 805-815 of the forwarding element 305 are shown in the figure. These stages are a continuation of the ones shown in the previous figure.

In the first stage 805, the forwarding element 305 has cached the flow entries 545 and 730 in the datapath cache 325. Each of the two entries is associated with a different wildcard mask. The first stage 605 shows the forwarding element receiving another packet 820.

The second stage 810 shows the extractor 330 parsing the packet 820 to populate a flow key data structure 825. In some embodiments, the extractor generates a flow key bitmask by computing the union of the wildcard masks. The flow key bitmask specifies that the bits associated with the ingress port value, Ethernet type, protocol, and TCP destination port number are un-wildcarded. Accordingly, the extractor chooses the ingress port value for the flow key data structure and extracts, from the packet header, the Ethernet type, protocol, and TCP destination port number.

The third stage 815 shows the forwarding element 305 finding a matching flow 730 to process the packet 820. Specifically, the classifier 360 has received the flow key 625. The classifier then uses only the ingress port value from the flow key to match against the first flow entry 545 (e.g., by hashing only the ingress port number and comparing this to a hash stored for the flow entry 545). As there is no match, the classifier next uses the values for the Ethernet type, protocol, and TCP destination port number from the flow key to match against the second flow entry 730 (e.g., by hashing these three values and comparing this to a hash stored for the flow entry 730). In this case, the lookup operations results in a match with the flow entry 730. The cache entry specifies that any packet that has the same Ethernet type, protocol, and TCP destination port number should be output to port three. Following this rule, the forwarding element 305 outputs the packet 820 through port three. In some embodiments, as shown, different values from the flow key are used to match against different flow entries (or different groups of flow entries). That is, rather than using the entire flow key for each lookup (or to generate a hash for all the lookups), some embodiments use different sets of values for different lookups (e.g., by generating different hashes from the different sets of values).

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
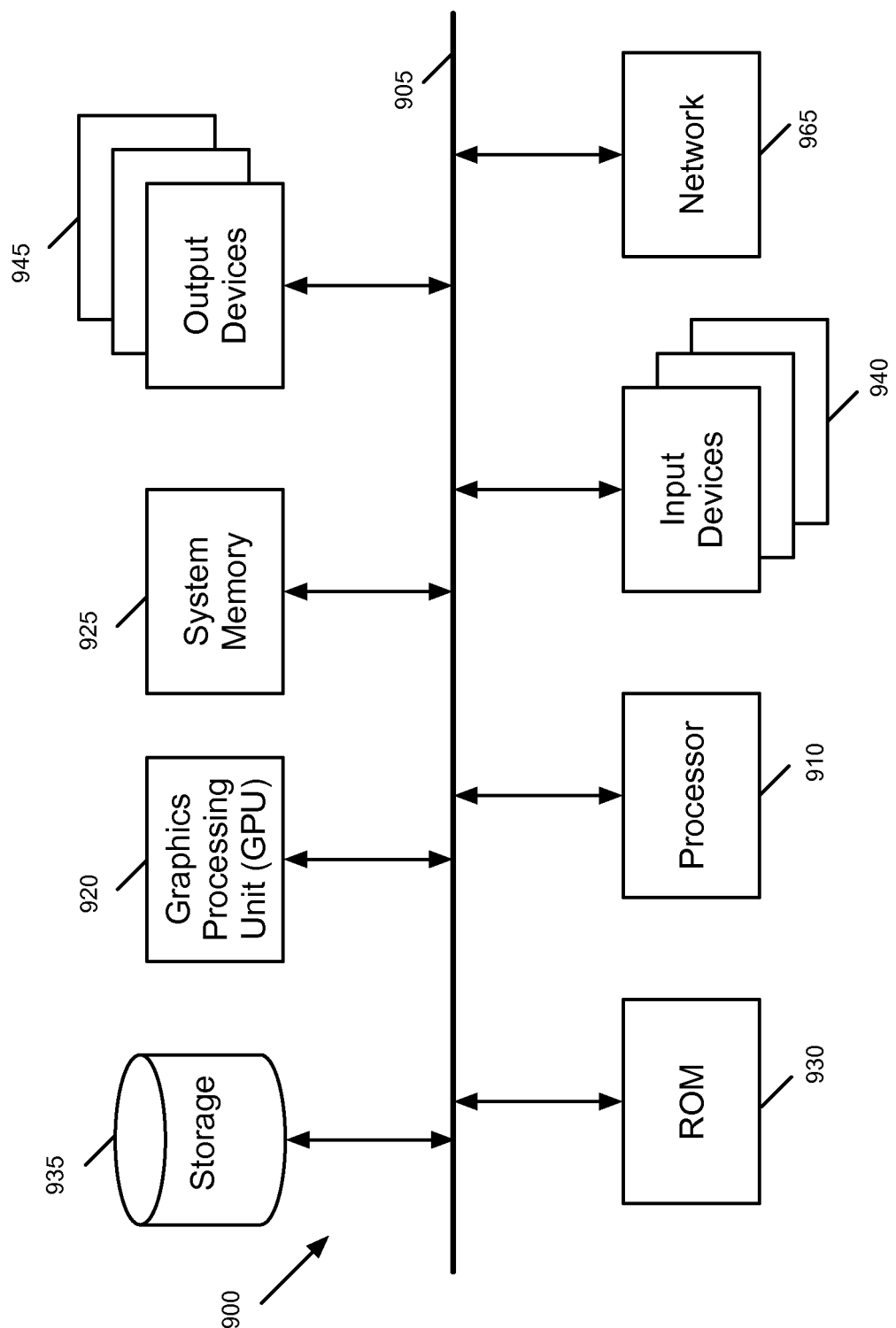
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash memory device, etc., and its corresponding drive) as the permanent storage device. Like the permanent storage device 935, the system memory 925 is a read-and-write memory device. However, unlike storage device 935, the system memory 925 is a volatile read-and-write memory, such a random access memory. The system memory 925 stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices 940 enable the user to communicate information and select commands to the electronic system. The input devices 940 include alphanumeric keyboards and pointing devices (also called "cursor control devices"), cameras (e.g., webcams), microphones or similar devices for receiving voice commands, etc. The output devices 945 display images generated by the electronic system or otherwise output data. The output devices 945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density, optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, it should be understood that the invention can be embodied in other specific forms without departing from the spirit of the invention. In addition, a number of the figures (including FIGS. 1 and 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, it should be understood that the invention is not to be limited by the foregoing illustrative details, but rather is to be defined by the appended claims.

What is claimed is:

1. A method for forwarding packets, the method comprising:
   identifying a plurality of flow entries in a flow cache, wherein (i) each respective flow entry in the flow cache comprises a respective set of fields with values defining a respective flow corresponding to the respective flow entry and (ii) at least two of the flow entries in the flow cache comprise different sets of fields;
   generating a flow key bitmask based on a union of the sets of fields of the plurality of flow entries in the flow cache such that each field included in at least one flow entry is included in the flow key bitmask and any field not included in any of the flow entries in the cache is not included in the flow key bitmask;
   upon receiving a packet comprising a plurality of header field values, using the flow key bitmask to generate a flow key directly from the packet, the flow key comprising only header field values corresponding to the fields in the flow key bitmask;
   using the flow key to identify a matching flow entry in the flow cache; and
   processing the packet based on the matching flow entry.

2. The method of claim 1, wherein each respective flow entry is associated with a respective wildcard bitmask that specifies the respective set of fields included in the respective flow entry.

3. The method of claim 1, wherein the flow key bitmask specifies (i) a first plurality of bits to extract from the packet when generating the flow key and (ii) a second plurality of bits to not extract from the packet when generating the flow key.

4. The method of claim 1 further comprising:
   when no matching flow entry is found in the flow cache, performing a lookup in a set of flow tables separate from the flow cache using at least one field that is not in the flow key.

5. The method of claim 1, wherein the matching flow entry comprises a particular set of fields that are included in the flow key bitmask with a particular set of values for the particular set of fields defining a particular flow, wherein using the flow key to identify a matching flow entry comprises:
   generating a hash from a subset of the flow key corresponding to the particular set of fields; and
   performing a lookup of the hash on the flow cache to determine that the generated hash matches a stored hash for a particular flow entry.

6. The method of claim 5, wherein using the flow key to identify the matching flow entry further comprises, upon determining that the generated hash matches the stored hash for the particular flow entry, determining whether values in the flow key for the particular set of fields match the particular set of values defining the particular flow for the particular flow entry.

7. The method of claim 1 further comprising:
   identifying a new flow entry added to the flow cache, wherein the new flow entry comprises a particular field not included in the flow key bitmask; and
   generating a new flow key bitmask to include the particular field.

8. The method of claim 7, wherein the packet is a first packet, the plurality of header field values is a first plurality of header field values, and the flow key is a first flow key, the method further comprising:
   upon receiving a second packet comprising a second plurality of header field values, using the new flow key bitmask to generate a second flow key directly from the second packet, the second flow key comprising only header field values corresponding to the fields in the new flow key bitmask;
   using the second flow key to identify a matching flow entry for the second packet in the flow cache; and
   processing the second packet based on the matching flow entry for the second packet.

9. The method of claim 4 further comprising adding a new flow entry to the flow cache based on the lookup in the set of flow tables, wherein the new flow entry is used to modify the flow key bitmask.

10. The method of 1, wherein the flow cache is dynamically updated and the flow key bitmask is dynamically updated based on updates to the flow cache.

11. A non-transitory machine readable medium storing a program which when executed by at least one processing unit forwards packets, the program comprising sets of instructions for:
    identifying a plurality of flow entries in a flow cache, wherein (i) each respective flow entry in the flow cache comprises a respective set of fields with values defining a respective flow corresponding to the respective flow entry and (ii) at least two of the flow entries in the flow cache comprise different sets of fields;
    generating a flow key bitmask based on a union of the sets of fields of the plurality of flow entries in the flow cache such that each field included in at least one flow entry is included in the flow key bitmask and any field not included in any of the flow entries in the cache is not included in the flow key bitmask;
    upon receiving a packet comprising a plurality of header field values, using the flow key bitmask to generate a flow key directly from the packet, the flow key comprising only header field values corresponding to the fields in the flow key bitmask;
    using the flow key to identify a matching flow entry in the flow cache; and
    processing the packet based on the matching flow entry.

12. The non-transitory machine readable medium of claim 11, wherein the flow key comprises a plurality of non-contiguous bits of the received packet.

13. The non-transitory machine readable medium of claim 11, wherein each respective flow entry is associated with a respective wildcard bitmask that specifies the respective set of fields included in the respective flow entry.

14. The non-transitory machine readable medium of claim 11, wherein the flow key bitmask specifies (i) a first plurality of bits to extract from the packet when generating the flow key and (ii) a second plurality of bits to not extract from the packet when generating the flow key.

15. The non-transitory machine readable medium of claim 14, wherein the program further comprises a set of instructions for:
when no matching flow entry is found in the flow cache, performing a lookup in a set of flow tables separate from the flow cache using at least one field that is not in the flow key.

16. The non-transitory machine readable medium of claim 11, wherein the matching flow entry comprises a particular set of fields that are included in the flow key bitmask with a particular set of values for the particular set of fields defining a particular flow, wherein the set of instructions for using the flow key to identify a matching flow entry comprises sets of instructions for:
generating a hash from a subset of the flow key corresponding to the particular set of fields; and
performing a lookup of the hash on the flow cache to determine that the generated hash matches a stored hash for a particular flow entry.

17. The non-transitory machine readable medium of claim 16, wherein the set of instructions for using the flow key to identify the matching flow entry further comprises a set of instructions for, upon determining that the generated hash matches the stored hash for the particular flow entry, determining whether values in the flow key for the particular set of fields match the particular set of values defining the particular flow for the particular flow entry.

18. A system comprising:
a set of processing units; and
a non-transitory machine readable medium storing a program which when executed by at least one of the processing units forwards packets, the program comprising sets of instructions for:
identifying a plurality of flow entries in a flow cache, wherein (i) each respective flow entry in the flow cache comprises a respective set of fields with values defining a respective flow corresponding to the respective flow entry and (ii) at least two of the flow entries in the flow cache comprise different sets of fields;
generating a flow key bitmask based on a union of the sets of fields of the plurality of flow entries in the flow cache such that each field included in at least one flow entry is included in the flow key bitmask and any field not included in any of the flow entries in the cache is not included in the flow key bitmask;
upon receiving a packet comprising a plurality of header field values, using the flow key bitmask to generate a flow key directly from the packet, the flow key comprising only header field values corresponding to the fields in the flow key bitmask;
using the flow key to identify a matching flow entry in the flow cache; and
processing the packet based on the matching flow entry.

19. The system of claim 18, wherein each respective flow entry is associated with a respective wildcard bitmask that specifies the respective set of fields included in the respective flow entry.

20. The system of claim 18, wherein the flow key bitmask specifies (i) a first plurality of bits to extract from the packet when generating the flow key and (ii) a second plurality of bits to not extract from the packet when generating the flow key.

* * * * *